(12) United States Patent
Hu

(10) Patent No.: US 10,183,247 B2
(45) Date of Patent: Jan. 22, 2019

(54) METHOD OF MANUFACTURING A ROTARY-TYPE PHYSICAL SHIELD PURIFIER

(71) Applicant: Duanzhi Hu, Shenzhen (CN)

(72) Inventor: Duanzhi Hu, Shenzhen (CN)

(73) Assignee: Duanzhi Hu, Shenzhen (CN)

( * ) Notice: Subject to any disclaimer, the term of this patent is extended or adjusted under 35 U.S.C. 154(b) by 195 days.

(21) Appl. No.: 15/323,553

(22) PCT Filed: Jun. 27, 2015

(86) PCT No.: PCT/CN2015/082585
§ 371 (c)(1),
(2) Date: Jan. 3, 2017

(87) PCT Pub. No.: WO2016/008358
PCT Pub. Date: Jan. 21, 2016

(65) Prior Publication Data
US 2017/0151517 A1    Jun. 1, 2017

(30) Foreign Application Priority Data

Jul. 15, 2014  (CN) .......................... 2014 1 0335346

(51) Int. Cl.
| *F24F 11/30* | (2018.01) |
| *B01D 45/14* | (2006.01) |
| *B21F 29/00* | (2006.01) |
| *B23K 1/00* | (2006.01) |
| *B21F 39/00* | (2006.01) |

(52) U.S. Cl.
CPC .............. *B01D 45/14* (2013.01); *B21F 29/00* (2013.01); *B21F 39/00* (2013.01); *B23K 1/00* (2013.01)

(58) Field of Classification Search
CPC . B01D 45/14; B23K 1/00; B21F 39/00; B21F 29/00
See application file for complete search history.

(56) References Cited

U.S. PATENT DOCUMENTS 6,098,973 A * 8/2000 Khachatoorian ....... B25B 5/101
269/182

FOREIGN PATENT DOCUMENTS

| CN | 101288817 A | * 10/2008 | ............. B01D 45/14 |
| CN | 201582898 U | * 9/2010 | |

OTHER PUBLICATIONS

English translation of CN101288817 published on Oct. 22, 2008.*
English translation of CN201582898 published on Sep. 15, 2010.*

* cited by examiner

*Primary Examiner* — Jun S Yoo
(74) *Attorney, Agent, or Firm* — CBM Patent Consulting, LLC

(57) ABSTRACT

A method for manufacturing a rotary physical shielding purifier, comprising the following steps: (1) respectively placing an outer rim, spokes and a central clamp base in an outer rim groove, spoke grooves and a central hole, and pressing a pressing die on the spokes; (2) using a welder to weld the contact parts between the spokes and the outer rim; (3) installing a central clamp gland on the central clamp base; and (4) separating the pressing die from a clamping die, and taking the finished product out.

9 Claims, 5 Drawing Sheets

METHOD OF MANUFACTURING A ROTARY-TYPE PHYSICAL SHIELD PURIFIER

This application is the U.S. national phase of International Application No. PCT/CN2015/082585 Filed on 27 Jun. 2015 which designated the U.S. and claims priority to Chinese Application Nos. CN 201410335346.7 filed on 15 Jul. 2014, the entire contents of each of which are hereby incorporated by reference.

FIELD OF THE INVENTION

The present invention relates to a component of a device for dedusting and purifying air, in particular to a method for manufacturing a rotary physical shielding purifier using a physical method to remove the particulate matters (mainly liquid particulates) in exhaust air.

BACKGROUND OF THE INVENTION

In order to purify the air and remove the particulate pollutants in the air, the researchers invent a dynamic physical shielding purifier in recent years, e.g. the Chinese Patent Authorized Announcement No. CN 100591405C, which discloses a dynamic physical shielding purifier, manufacturing method and special fixture, wherein the disclosed dynamic physical shielding purifier comprises a wheel hub and a plurality of circular spokes; one ends of the spokes are radially fixed on the wheel hub, and the other ends of the spokes are fixed on a fixing ring. The defects of the dynamic physical shielding purifier, manufacturing method and special fixture are obvious, because in the manufacturing method, the two ends of the spokes are respectively fixedly connected with the wheel hub and the fixing ring via a welder or a super glue; the welder will generate heat when in use, and the generated heat lengthens the axial length of the spokes, causing the middle of the spokes to camber, and the whole purifier pan to twist and deform, such that the spokes can not be maintained in the same plane, thus severely deviating the purifier from the state required by the purification theory, and greatly reducing the overall purification efficiency of the dynamic physical shielding purifier. Furthermore, the twisted and deformed purifier is dynamically unbalanced, and will generate noises and mechanical damage during operation. Since the spokes are fixed by a super glue and generally operates in a high temperature environment, the super glue is easy to lose stickiness, with the result that the spokes become loose or detach from the wheel hub and/or the fixing ring. Even if the spokes do not become loose or detach from the wheel hub and/or the fixing ring, the axial length of the spokes staying in the high temperature environment for a long time is also easy to be lengthened, and the purifier will twist. Therefore, the dynamic physical shielding purifier manufactured with the manufacturing method has a low up-to-standard rate, greatly wastes resources, and has the problems of short service life, low stability, high production cost and the like.

BRIEF DESCRIPTION OF THE INVENTION

In order to address the above problems, the present invention provides the society with a method for manufacturing a rotary physical shielding purifier, and the rotary physical shielding purifier manufactured the manufacturing method has the advantages of long service life, high up-to-standard rate, high stability, high purification efficiency, low production cost and the like.

The technical solution of the present invention is: providing a method for manufacturing a rotary physical shielding purifier, comprising the following steps:

(1) Placing spokes and an outer rim on a clamping die, wherein the clamping die has the following structure: comprising a clamping die body, a central hole disposed on the clamping die body, a plurality of spoke grooves disposed with the circle center of the central hole as a radiant point, and an outer rim groove disposed on the clamping die at a position far away from the central hole and in communication with the spoke grooves;

Respectively placing the outer rim, the spokes and a central clamp base in the outer rim groove, the spoke grooves and the central hole, ensuring that the outer rim contacts the spokes, and the inner ends of the spokes extend in the central hole; and pressing a pressing die on the spokes, ensuring that a section of the inner end of each spoke and the contact parts between the spokes and the outer rim are exposed outside the pressing die;

Alternatively, respectively placing the outer rim and the spokes in the outer rim groove and the spoke grooves, ensuring that the outer rim contacts the spokes, and the inner ends of the spokes extend in the central hole; pressing the pressing die on the spokes, ensuring that a section of the inner end of each spoke and the contact parts between the spokes and the outer rim are exposed outside the pressing die; and then placing the central clamp base in the central hole;

(2) Using a welder to weld the contact parts between the spokes and the outer rim;

(3) Installing a central clamp gland on the central clamp base, wherein the central clap gland fixes the inner ends of the spokes between the central clamp base and the central clamp gland via a clamping device; and (4) Separating the pressing die from the clamping die, and taking the finished product out.

As an improvement to the present invention, the central clamp gland is a recessed cambered cover; an axial sleeve hole is disposed in the center of the cambered cover; the circumference of the cambered cover forms into a pressing ring; when installing the central clamp gland on the central clamp base, the pressing ring is pressed on the spokes; when a pressure is applied on the cambered cover, a comparatively high pressure intensity can be formed between the pressing ring and the spokes because the contact area between the pressing ring and the spokes is small, such that the spokes are tightly fixed between the pressing ring and the central clamp base.

As an improvement to the present invention, a plurality of radial upper spoke positioning grooves are disposed on the pressing ring.

As an improvement to the present invention, the central clamp gland comprises an axial sleeve hole, a bottom compression joint part, and an upper compression joint part matched with the bottom compression joint part; a plurality of radial upper spoke positioning grooves are disposed on the upper compression joint part.

As an improvement to the present invention, a positioning boss is used to replace the central clamp base in the step (1); and After the step (2), the method further comprises the following step:

(21) Detaching the positioning boss from the central hole, and then placing the central clamp base in the central hole.

As an improvement to the present invention, the central clamp base comprises a bottom compression joint part having a planar upper surface, a boss protruding from the upper surface of the bottom compression joint part, and an axial sleeve matched with the axial sleeve hole and penetrating through the bottom compression joint part and the boss.

As an improvement to the present invention, a plurality of radial lower spoke positioning grooves are disposed on the bottom compression joint part.

As an improvement to the present invention, the clamping die body comprises an inner die and an outer die which are connected to each other, wherein the inner die is made from a nonmetal material, and the outer die is made from a good conductor metal; the spoke grooves are disposed on the inner die and the outer die; and the outer rim groove is disposed on the outer die.

As an improvement to the present invention, the pressing die comprises a pressing plate; a through hole is disposed on the pressing plate; the position of the through hole corresponds to the position of the central hole; the diameter of the through hole is greater than or equal to the diameter of the central hole; and the pressing plate presses the spokes between the central hole and the outer rim on the clamping die.

As an improvement to the present invention, the clamping device is an arched clamp comprising a clamp body, a threaded rod, a clamp head and a handspike; the lower part of the clamp body is a bottom plate which is integrally casted with the clamp body; the threaded rod is rotatably disposed on the clamp body; the two ends of the threaded rod are respectively connected to the clamp head and the handspike; when in use, the handspike rotates and drives the threaded rod to move downwards, and drives the clamp head to move towards the bottom plate of the clamp body.

In the present invention, first of all, the contact parts between the spokes and the outer rim are firmly welded, and the pressing die is pressed on the spokes, such that the spokes will not camber and are maintained in the same plane all the time during welding; then, the inner ends of the spokes are fixed between the central clamp base and the central clamp gland, thus thoroughly preventing the spokes from twisting and cambering occurred in the product manufactured with other methods such as two ends welding or other connecting methods, such that the spokes are in the same plane, namely the whole purifier pan is maintained in the same plane. Furthermore, the spokes will neither displace even if being used in a high temperature environment for a long time, nor in different planes because the spokes become bigger in the axial direction. Therefore, the present invention will not reduce the purification capability for intercepting the particulate matters in the air, will not generate noises or cause mechanical damage, and has the advantages of long service life, high up-to-standard rate, high stability, high purification efficiency, low production cost and the like.

Wherein: 1. outer rim; 2. spoke; 31. central clamp base; 311. bottom compression joint part; 312. boss; 313. axial sleeve; 32. central clamp gland; 321. annular protrusion; 4. clamping die body; 41. outer rim groove; 42. spoke groove; 43. central hole; 44. inner die; 45. outer die; 5. pressing die; 6. positioning boss; 61. positioning protrusion.

DETAILED DESCRIPTION OF THE INVENTION

It shall be appreciated that in the description of the present invention, the direction or position relationships indicated by the terminologies "central" "on", "under" "front" "back", "left", "right" and the like are the direction or position relationships as shown in the figures, are only intended to facilitate and simplify the description of the present invention, but not to indicate or imply that the indicated devices or elements must be at a specific position or be constructed and operated in a specific manner, which shall not be understood as limits to the present invention. In addition, the terminologies "first" and "second" are only used for the purpose of description, but not for indicating or implying relative importance.

It shall be noted that in the description of the present invention, unless otherwise stated or defined, the terminologies "install", "connect" and "connection" shall be interpreted broadly, for example, the "connection" can be fixed connection, detachable connection or integral connection, mechanical connection or electrical connection, direct connection or indirect connection via an intermediate medium, or internal communication of two elements. An ordinary person skilled in the art could understand the specific meanings of the terminologies in the present invention according to specific circumstances. In addition, in the description of the present invention, unless otherwise stated, the terminologies "multiple" and "a plurality of" mean two or more.

Figure 1:
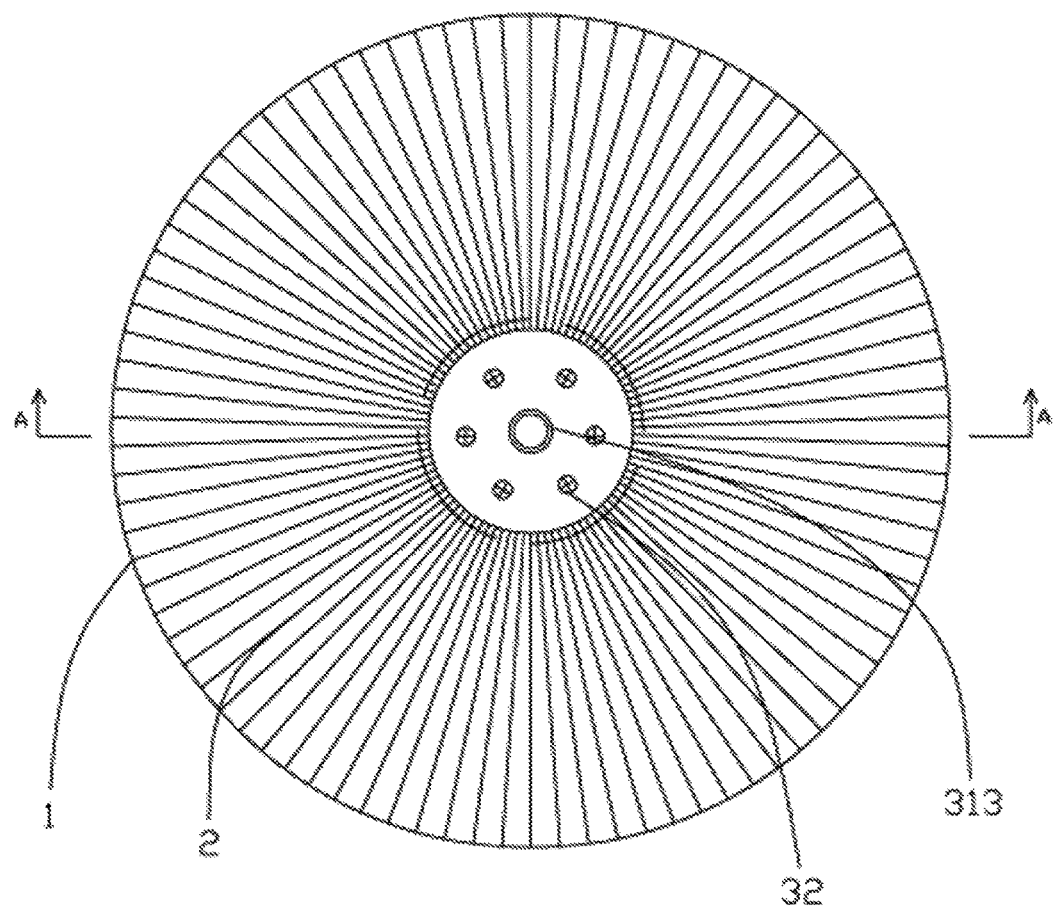
FIG. 1 is a planar structure schematic diagram of the present invention.
Figure 2:
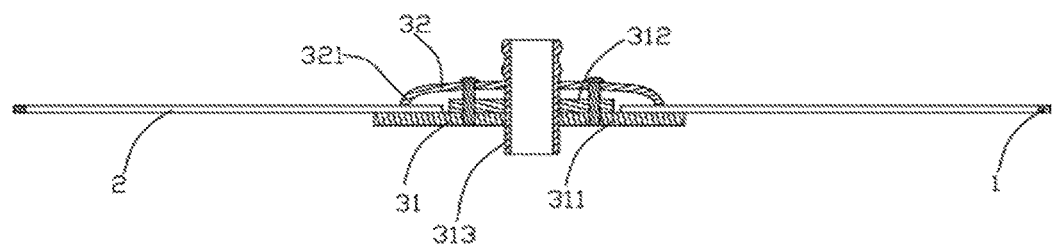
FIG. 2 is an A-A sectional structure schematic diagram of the purifier as shown in FIG. 1.

Please refer to FIG. 1 and FIG. 2 which depict a rotary physical shielding purifier. The purifier comprises a plurality of spokes 2, a central clamp base 31 and a central clamp gland 32 installed on the central clamp base 31; the inner ends of the spokes 2 are radially fixed between the central clamp base 31 and the central clamp gland 32; an outer rim 1 is welded on the outer ends of the spokes 2 with an internal welding method (e.g. resistance welding) instead of an external welding method (e.g. laser welding); the internal welding can prevent the occurrence of the faults due to false welding, de-soldering and the like. When the spokes 2 are welded onto the outer rim 1, the outer rim 1 can be placed under the spokes 2 instead of at the top of the spokes 2, which facilitates the interception, throw-out and recovery of the particles in the air, and facilitates cleaning.

In the present embodiment, the central clamp base 31 comprises a bottom compression joint part 311 having a planar upper surface, a boss 312 protruding from the upper surface of the bottom compression joint part 311, and an axial sleeve 313 penetrating through the bottom compression joint part 311 and the boss 312. The central clamp base 31 is a die casted piece or a work piece; the axial sleeve 313 is disposed in the inner ring of the central clamp base 31, and is used to link an electric motor; the intermediate ring of the central clamp base 31 is a spoke positioning piece; and the outer ring of the central clamp base 31 is a spoke clamping area.

In the present embodiment, the central clamp gland 32 is a recessed cambered cover; an axial sleeve hole matched with the axial sleeve 313 is disposed in the center of the cambered cover. The circumference of the cambered cover forms into a pressing ring 321; when installing the central clamp gland 32 on the central clamp base 31, the pressing ring 321 is pressed on the spokes 2; when a pressure is applied on the cambered cover, a comparatively high pressure intensity can be formed between the pressing ring 321 and the spokes 2 because the contact area between the pressing ring 321 and the spokes 2 is small, such that the spokes 2 are tightly fixed between the pressing ring 321 and the central clamp base 31. When installing the central clamp gland 32 on the central clamp base 31 via the axial sleeve hole, the boss 312 is received in the central clamp gland 32; the central clamp gland 32 is fixed on the central clamp base 31 via a screw or a bolt; the bolt holes matched with the screw or the bolt are respectively disposed on the boss 312 and the central clamp gland 32; and the boss 312 plays the role of positioning.

In the present embodiment, the central clamp gland 32 and the central clamp base 31 have the following advantages: when being used in a high temperature environment for a long time, the spokes 2 will not displace even if the spokes 2 become longer in the axial direction; the added length of the spokes 2 will extend into the gap between the central clamp base 31 and the central clamp gland 32, so the spokes 2 will not camber or deform, and the spokes 2 will still maintain in the tight state, thus improving the purification capability for cutting the particulate matters in the air. In case that a spoke 2 cracks at a certain position, the damaged spoke 2 can be replaced in time, thus having the advantages of easy maintenance, high stability, high purification efficiency and the like.

In the present embodiment, it shall be specially noted that when in installation, one end of the spoke 2 will contact the bottom compression joint part 311, and the annular protrusion 321 presses the middle of the contact place on the bottom compression joint part 311. Such design improves the fixing effect of the spokes 2.

In the present embodiment, the diameter of the spokes 2 is preferably between 0.3 mm and 10 mm, and the product multiplied the diameter of the spokes 2 by the number of the spokes 2 is preferably greater than or equal to 46 and less than or equal to 460, in which case the purification effect is optimum. The outer rim 1 is made from a stainless steel alloy having a diameter greater than or equal to the diameter of the spokes 2.

In the present embodiment, in order to fix the inner ends of the spokes 2 more easily, a plurality of radial lower spoke positioning grooves (unshown in the figure) are disposed on the bottom compression joint part 311, and/or a plurality of radial upper spoke positioning grooves (unshown in the figure) are disposed on the annular protrusion 321. The central clamp gland 32 can also adopt the following structure: comprising an axial sleeve hole matched with the axial sleeve 313, and an upper compression joint part having a planar lower surface and matched with the bottom compression joint part 311. When using the central clamp gland 32 with such structure, either a plurality of radial lower spoke positioning grooves are disposed on the bottom compression joint part 311, or a plurality of radial upper spoke positioning grooves are disposed on the annular protrusion 321. The upper spoke positioning grooves are matched with the lower spoke positioning grooves.

Figure 3:
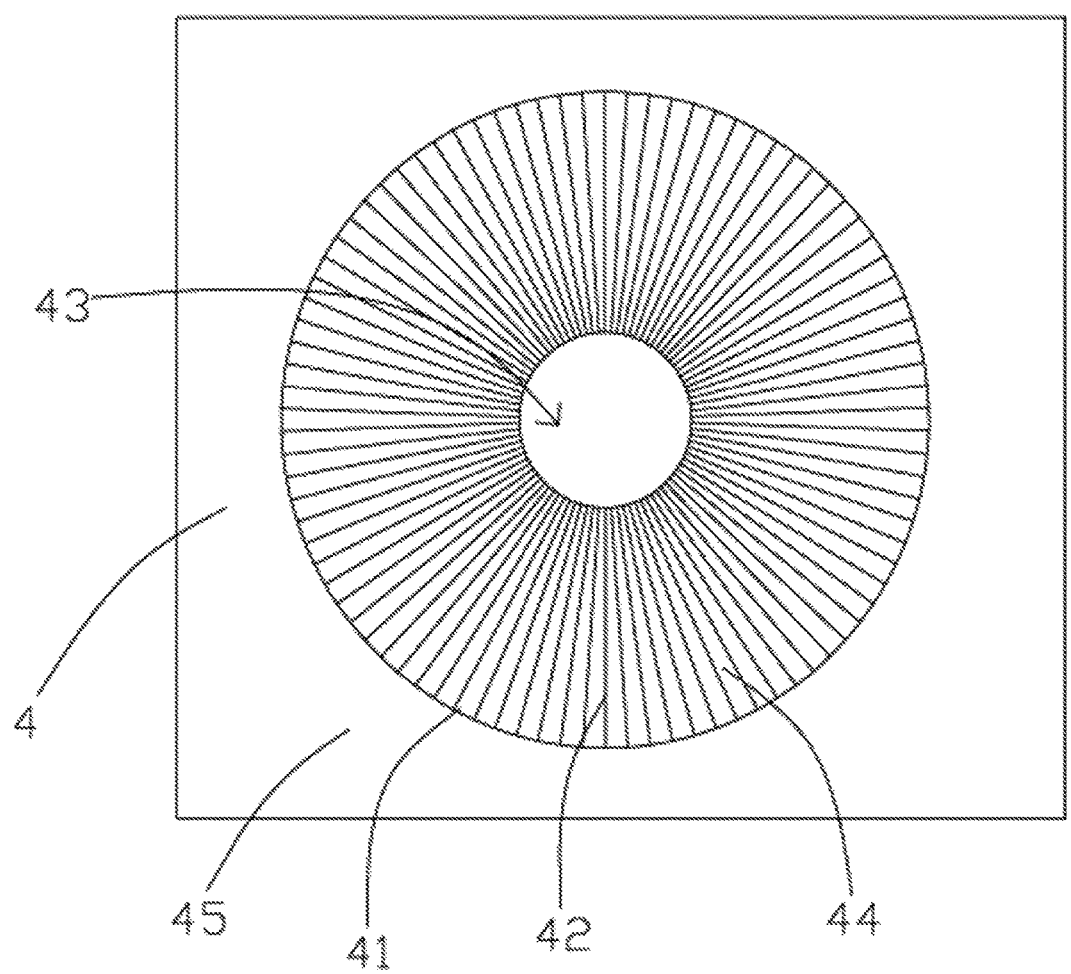
FIG. 3 is a planar structure schematic diagram of the clamping die in the present invention.
Figure 4:
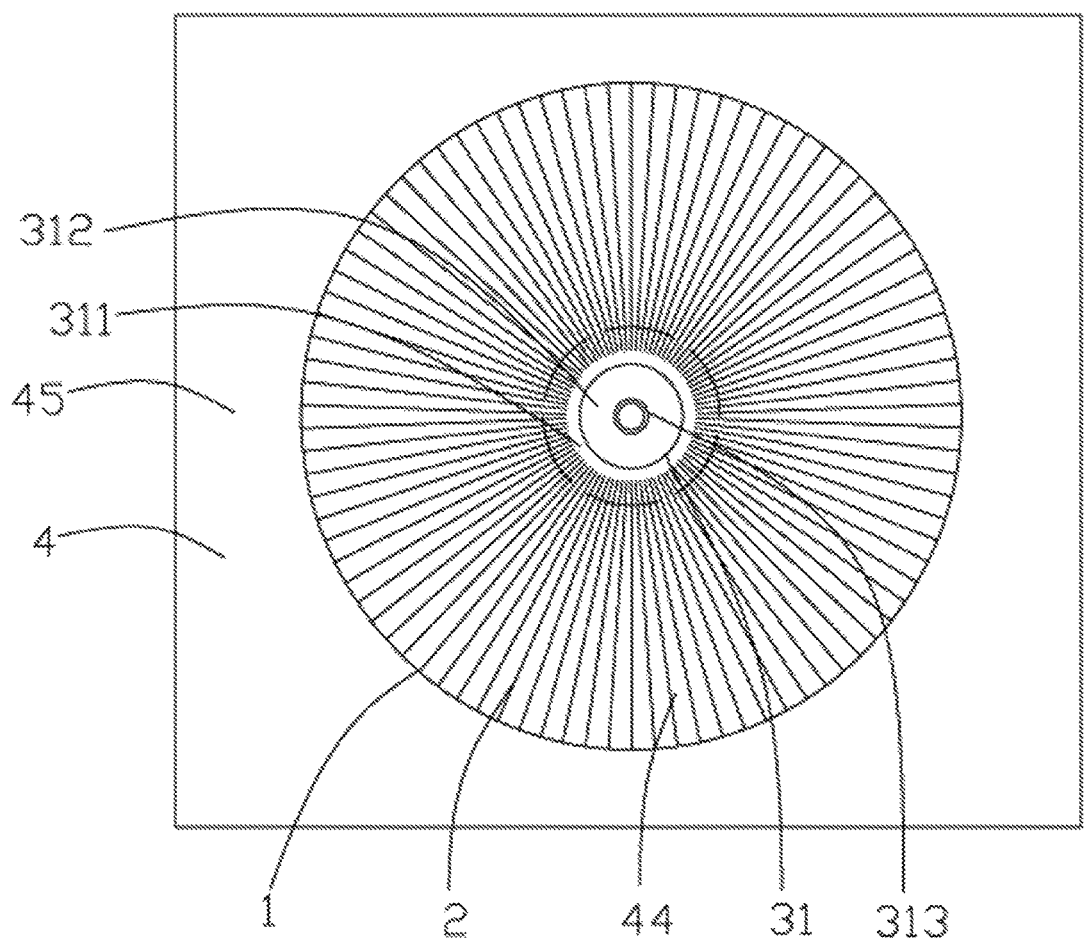
FIG. 4 is a structural schematic diagram of the clamping die as shown in FIG. 3 after the fixing ring, the spokes and the central clamp base are disposed therein.
Figure 5:
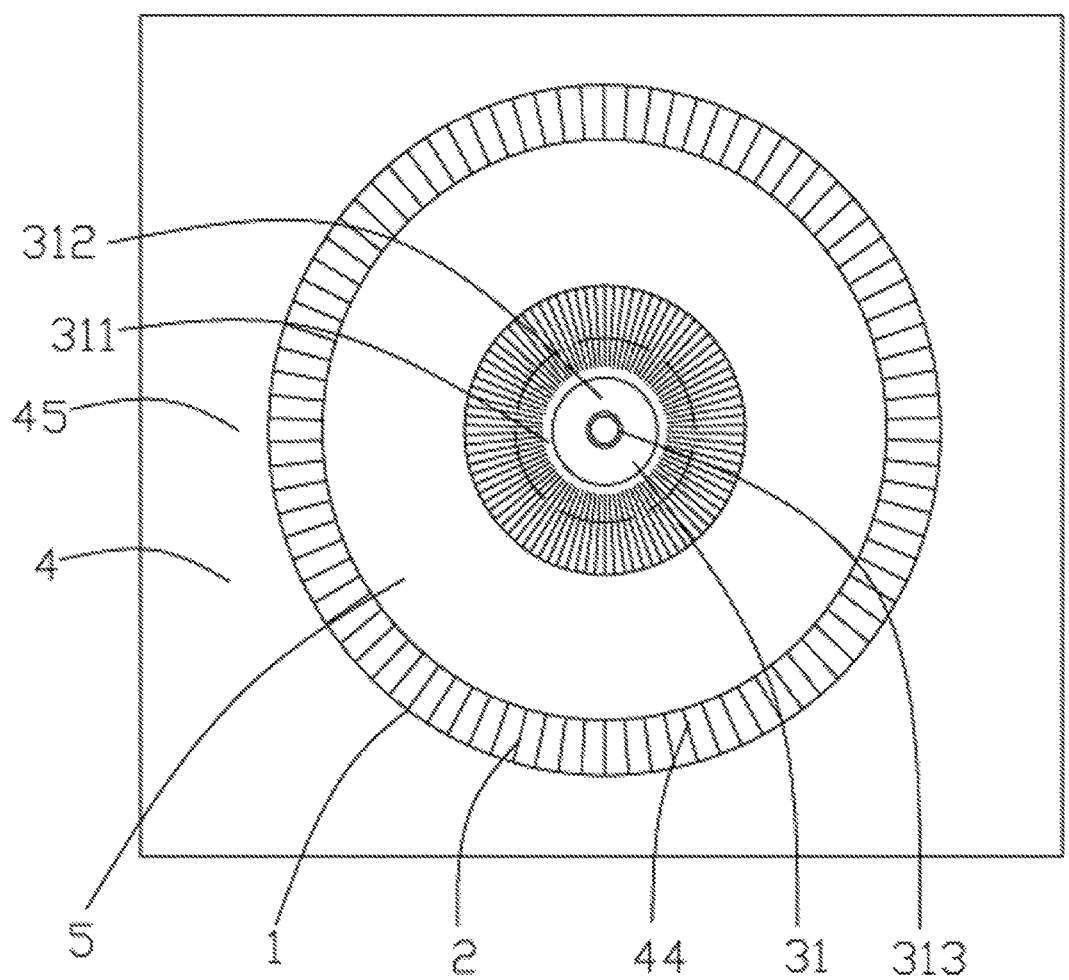
FIG. 5 is a structural schematic diagram of the clamping die after installing a pressing die on the basis of FIG. 4.

As shown in FIG. 3 and FIG. 5, a method for manufacturing the rotary physical shielding purifier, comprises the following steps:

(1) Placing the spokes 2 and the outer rim 1 on a clamping die, wherein the clamping die has the following structure: comprising a clamping die body 4, a central hole 43 disposed on the clamping die body 4, a plurality of spoke grooves 42 disposed with the circle center of the central hole 43 as a radiant point, and an outer rim groove 41 disposed on the clamping die at a position far away from the central hole 43 and in communication with the spoke grooves 42;

Respectively placing the outer rim 1, the spokes 2 and the central clamp base 31 in the outer rim groove 41, the spoke grooves 42 and the central hole 43, ensuring that the outer rim 1 contacts the spokes 2, and the inner ends of the spokes 2 extend in the central hole 43; and pressing a pressing die 5 on the spokes 2, ensuring that a section of the inner end of each spoke 2 and the contact parts between the spokes 2 and the outer rim 1 are exposed outside the pressing die 5;

Alternatively, respectively placing the outer rim 1 and the spokes 2 in the outer rim groove 41 and the spoke grooves 42, ensuring that the outer rim 1 contacts the spokes 2, and the inner ends of the spokes 2 extend in the central hole 43; pressing the pressing die 5 on the spokes 2, ensuring that a section of the inner end of each spoke 2 and the contact parts between the spokes 2 and the outer rim 1 are exposed outside the pressing die 5; and then placing the central clamp base 31 in the central hole 43;

(2) Using a welder to weld the contact parts between the spokes 2 and the outer rim 1 (with the resistance welding method);

(3) Installing a central clamp gland (unshown in the figure) on the central clamp base 31, wherein the central clap gland fixes the inner ends of the spokes 2 between the central clamp base 31 and the central clamp gland via a clamping device (unshown in the figure); and (4) Separating the pressing die 5 from the clamping die, and taking the finished product out.

In the present method, the central clamp base 31 comprises a bottom compression joint part 311 having a planar upper surface, a boss 312 protruding from the upper surface of the bottom compression joint part 311, and an axial sleeve 313 penetrating through the bottom compression joint part 311 and the boss 312.

In the present method, the central clamp gland is a recessed cambered cover; an axial sleeve hole matched with the axial sleeve 313 is disposed in the center of the cambered cover. The circumference of the cambered cover forms into a pressing ring; when installing the central clamp gland on the central clamp base 31, the pressing ring is pressed on the spokes 2; when a pressure is applied on the cambered cover, a comparatively high pressure intensity can be formed between the pressing ring and the spokes 2 because the contact area between the pressing ring and the spokes 2 is small, such that the spokes 2 are tightly fixed between the pressing ring and the central clamp base 31. When installing the central clamp gland on the central clamp base 31 via the axial sleeve hole, the boss 312 is received in the central clamp gland; the central clamp gland is fixed on the central clamp base 31 via a screw or a bolt; the bolt holes matched with the screw or the bolt are respectively disposed on the boss 312 and the central clamp gland; and the boss 312 plays the role of positioning.

In the present method, the central clamp gland and the central clamp base 31 have the following advantages: when being used in a high temperature environment for a long time, the spokes 2 will not displace even if the spokes 2 become longer in the axial direction; the added length of the spokes 2 will extend into the gap between the central clamp base 31 and the central clamp gland, so the spokes 2 will not camber or deform, and the spokes 2 will still maintain in the tight state, thus improving the purification capability for cutting the particulate matters in the air.

In the present method, it shall be specially noted that when in installation, one end of the spoke 2 will contact the bottom compression joint part 311, and the pressing ring 1 presses the middle of the contact with the spoke 2 on the bottom compression joint part 311. Such design improves the fixing effect of the spokes 2.

In the present method, in order to fix the inner ends of the spokes 2 more easily, a plurality of radial lower spoke positioning grooves (unshown in the figure) are disposed on the bottom compression joint part 311, and/or a plurality of radial upper spoke positioning grooves (unshown in the figure) are disposed on the pressing ring 1. The central clamp gland can also adopt the following structure: comprising an axial sleeve hole matched with the axial sleeve 313, and an upper compression joint part having a planar lower surface and matched with the bottom compression joint part 311. When using the central clamp gland 32 with such structure, either a plurality of radial lower spoke positioning grooves are disposed on the bottom compression joint part 311, or a plurality of radial upper spoke positioning grooves are disposed on the pressing ring. The upper spoke positioning grooves are matched with the lower spoke positioning grooves.

Figure 6:
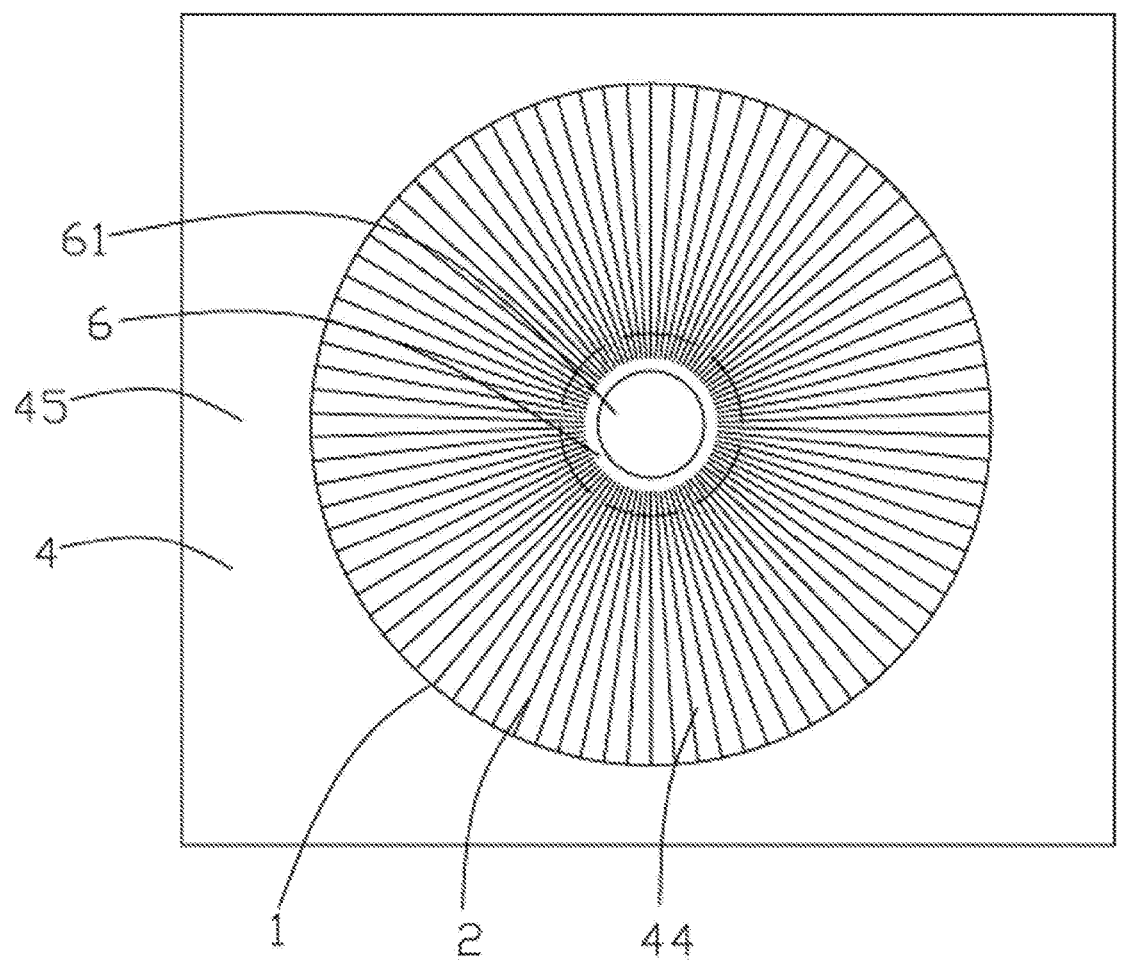
FIG. 6 is a structural schematic diagram of the clamping die as shown in FIG. 3 after the fixing ring, the spokes and the positioning boss are disposed therein.

In the present method, a positioning boss (please refer to the positioning boss 6 as shown in FIG. 6, wherein the positioning boss 6 comprising a positioning plate, and a positioning protrusion 61 protruding out of the positioning plate) is used to replace the central clamp base 31 as shown in the step (1). After the step (2), the method further comprises the following step: (21) Detaching the positioning boss 6 from the central hole 43, and then placing the central clamp base 31 in the central hole 43.

In the present method, the clamping die body 4 comprises an inner die 44 and an outer die 45 which are connected to each other, wherein the inner die 44 is made from a nonmetal material, and the outer die 45 is made from a good conductor metal; the spoke grooves 42 are disposed on the inner die 44 and the outer die 45; and the outer rim groove 41 is disposed on the outer die. Such design saves resources.

In the present method, the pressing die 5 comprises a pressing plate; a through hole is disposed on the pressing plate; the position of the through hole corresponds to the position of the central hole 43; the diameter of the through hole is greater than or equal to the diameter of the central hole 43; and the pressing plate presses the spokes 2 between the central hole 43 and the outer rim 1 on the clamping die 4. The use of the pressing die 5 can effectively prevent the spokes 2 from cambering, and ensure all the spokes 2 in a straightened state. Especially when a great deal of heat is generated during welding, the generated heat can extend the length of the spokes 2, and the spokes 2 will not camber under the action of the pressing die 5; the added length of the spokes 2 will extend in the axial direction of the spokes 2, such that all the spokes 2 are maintained in the same plane all the time. The spokes 2 can be straight or non-straight spokes. Furthermore, the inner ends of the spokes are pressed on the central clamp base 31, and the central clamp gland is installed after all the spokes 2 are welded, thus effectively ensuring the quality and stability of the manufactured product. The pressing die 5 is an annular pressing die, the maximum diameter of which is less than the diameter of the outer rim 1.

In the present method, the clamping device is an arched clamp comprising a clamp body, a threaded rod, a clamp head and a handspike; the lower part of the clamp body is a bottom plate which is integrally casted with the clamp body; the threaded rod is rotatably disposed on the clamp body; the two ends of the threaded rod are respectively connected to the clamp head and the handspike; when in use, the handspike rotates and drives the threaded rod to move downwards, and drives the clamp head to move towards the bottom plate of the clamp body; and the clamp head tightly clamps the pressing die 5 and the clamping die. The clamping device can further comprise a downward placing structure and a downward pressing structure disposed corresponding to the downward placing structure; a driving device drives the downward pressing structure to move; the pressing die 5 and the clamping die are disposed between the downward placing structure and the downward pressing structure. In the present method, a plurality of outer rim grooves 41 having different diameters and the same circle center are respectively disposed on the clamping die; and the smaller the angle between every two spokes grooves 42 is, the better. Such design can use the outer rim grooves 41 satisfying requirements, and select the spoke grooves 42 satisfying the angle requirement according to the practical requirements, thus saving resources.

What is claimed is:

1. A method for manufacturing a rotary physical shielding purifier, characterized by, comprising the following steps:
   (1) placing spokes and an outer rim on a clamping die, wherein the clamping die has the following structure: comprising a clamping die body, a central hole disposed on the clamping die body, a plurality of spoke grooves disposed with the circle center of the central hole as a radiant point, and an outer rim groove disposed on the clamping die at a position far away from the central hole and in communication with the spoke grooves;
   respectively placing the outer rim, the spokes and a central clamp base in the outer rim groove, the spoke grooves and the central hole, ensuring that the outer rim contacts the spokes, and the inner ends of the spokes extend in the central hole; and pressing a pressing die on the spokes, ensuring that a section of the inner end of each spoke and the contact parts between the spokes and the outer rim are exposed outside the pressing die;
   alternatively, respectively placing the outer rim and the spokes in the outer rim groove and the spoke grooves, ensuring that the outer rim contacts the spokes, and the inner ends of the spokes extend in the central hole; pressing the pressing die on the spokes, ensuring that a section of the inner end of each spoke and the contact parts between the spokes and the outer rim are exposed outside the pressing die; and then placing the central clamp base in the central hole;
   (2) using a welder to weld the contact parts between the spokes and the outer rim;
   (3) installing a central clamp gland on the central clamp base, wherein the central clap gland fixes the inner ends of the spokes between the central clamp base and the central clamp gland via a clamping device; and
   (4) separating the pressing die from the clamping die, and taking the finished product out;

wherein the central clamp gland is a recessed cambered cover; an axial sleeve hole is disposed in the center of the cambered cover; the circumference of the cambered cover forms into a pressing ring; when installing the central clamp gland on the central clamp base, the pressing ring is pressed on the spokes; when a pressure is applied on the cambered cover, a comparatively high pressure intensity can be formed between the pressing ring and the spokes because the contact area between the pressing ring and the spokes is small, such that the spokes are tightly fixed between the pressing ring and the central clamp base.

2. The method for manufacturing a rotary physical shielding purifier according to claim 1, characterized in that, a plurality of radial upper spoke positioning grooves are disposed on the pressing ring.

3. The method for manufacturing a rotary physical shielding purifier according to claim 1, characterized in that, the central clamp gland comprises an axial sleeve hole, a center clamp base, and an upper compression joint part;

a plurality of radial upper spoke positioning grooves are disposed on the upper compression joint part.

4. The method for manufacturing a rotary physical shielding purifier according to claim 1, characterized in that, a positioning boss is used to replace the central clamp base in the step (1); and after the step (2), the method further comprises the following step:

(21) Detaching the positioning boss from the central hole, and then placing the central clamp base in the central hole.

5. The method for manufacturing a rotary physical shielding purifier according to claim 1, characterized in that, the central clamp base comprises a bottom compression joint part having a planar upper surface, a boss protruding from the upper surface of the bottom compression joint part, and an axial sleeve matched with an axial sleeve hole and penetrating through the bottom compression joint part and the boss.

6. The method for manufacturing a rotary physical shielding purifier according to claim 5, characterized in that, a plurality of radial lower spoke positioning grooves are disposed on the bottom compression joint part.

7. The method for manufacturing a rotary physical shielding purifier according to claim 1, characterized in that, the clamping die body comprises an inner die and an outer die which are connected to each other, wherein the inner die is made from a nonmetal material, and the outer die is made from a good conductor metal; the spoke grooves are disposed on the inner die and the outer die; and the outer rim groove is disposed on the outer die.

8. The method for manufacturing a rotary physical shielding purifier according to claim 1, characterized in that, the pressing die comprises a pressing plate; a through hole is disposed on the pressing plate; the position of the through hole corresponds to the position of the central hole; the diameter of the through hole is greater than or equal to the diameter of the central hole; and the pressing plate presses the spokes between the central hole and the outer rim on the clamping die.

9. The method for manufacturing a rotary physical shielding purifier according to claim 1, characterized in that, the clamping device is an arched clamp comprising a clamp body, a threaded rod, a clamp head and a handspike; the lower part of the clamp body is a bottom plate which is integrally casted with the clamp body; the threaded rod is rotatably disposed on the clamp body; the two ends of the threaded rod are respectively connected to the clamp head and the handspike; when in use, the handspike rotates and drives the threaded rod to move downwards, and drives the clamp head to move towards the bottom plate of the clamp body.

* * * * *